United States Patent [19]

Pung et al.

[11] Patent Number: 5,027,293
[45] Date of Patent: Jun. 25, 1991

[54] METHOD AND APPARATUS FOR ANALYZING MACHINE CONTROL SYSTEMS

[75] Inventors: David G. Pung, Minnetonka; Alan D. Carty, Eden Prairie, both of Minn.

[73] Assignee: Alliance Technical Services, Inc., Chaska, Minn.

[21] Appl. No.: 306,876

[22] Filed: Feb. 3, 1989

[51] Int. Cl.$^5$ .................. G06F 15/46; B65H 7/00; B65H 26/00
[52] U.S. Cl. .................. 364/550; 271/202; 340/675; 340/825.06; 364/188; 364/471
[58] Field of Search .................. 364/550, 551.01, 556, 364/579, 468, 469, 471, 188; 340/675, 676, 679, 825.06; 271/202

[56] References Cited

U.S. PATENT DOCUMENTS

| | | | |
|---|---|---|---|
| 4,200,276 | 4/1980 | Marschke | 271/202 |
| 4,497,027 | 1/1985 | McGuire et al. | 364/471 |
| 4,576,663 | 3/1986 | Bory | 364/471 |
| 4,598,901 | 7/1986 | Thomas | 271/202 |
| 4,628,435 | 12/1986 | Tashiro et al. | 364/468 |
| 4,639,881 | 1/1987 | Zingher | 364/188 |
| 4,718,025 | 1/1988 | Minor et al. | 364/550 |
| 4,803,634 | 2/1989 | Ohno et al. | 364/471 |
| 4,815,014 | 3/1989 | Lipner et al. | 364/188 |
| 4,873,623 | 10/1989 | Lane et al. | 364/188 |
| 4,882,670 | 11/1989 | Isobe et al. | 364/188 |

OTHER PUBLICATIONS

"Microprocessor Interfacing", Heathkit (1984), pp. 3-10 through 3-12.
The Downstacker, by Marquip Inc.
The Black Belt Rotary Shear, by Marquip, Inc., 1986.
The Improved Tailgrabber, by Marquip Inc., 1983.
The New Marquip Model III Direct Drive Cut-Off Knife . . . by Marquip Inc.
Quickset Slitter/Scorer, by Marquip Inc., 1985.
Agnati Tappi 88.
Causes and Control of Warp in Corrugated Board (Boxboard Containers).

Primary Examiner—Kevin J. Teska
Attorney, Agent, or Firm—Kinney & Lange

[57] ABSTRACT

A diagnostic system analyzes conditions of critical points in a production line. The diagnostic system generates an operator message based on the conditions it analyzes. A sensor senses the conditions of the critical points in the production line and generates critical point signals representative of the conditions of the critical points. An isolator receives the critical point signals and generates logic signals representative of the critical point signals. The isolator isolates the logic signals from the critical point signals. A controller receives the logic signals and generates an operator message based on the logic signals.

73 Claims, 13 Drawing Sheets

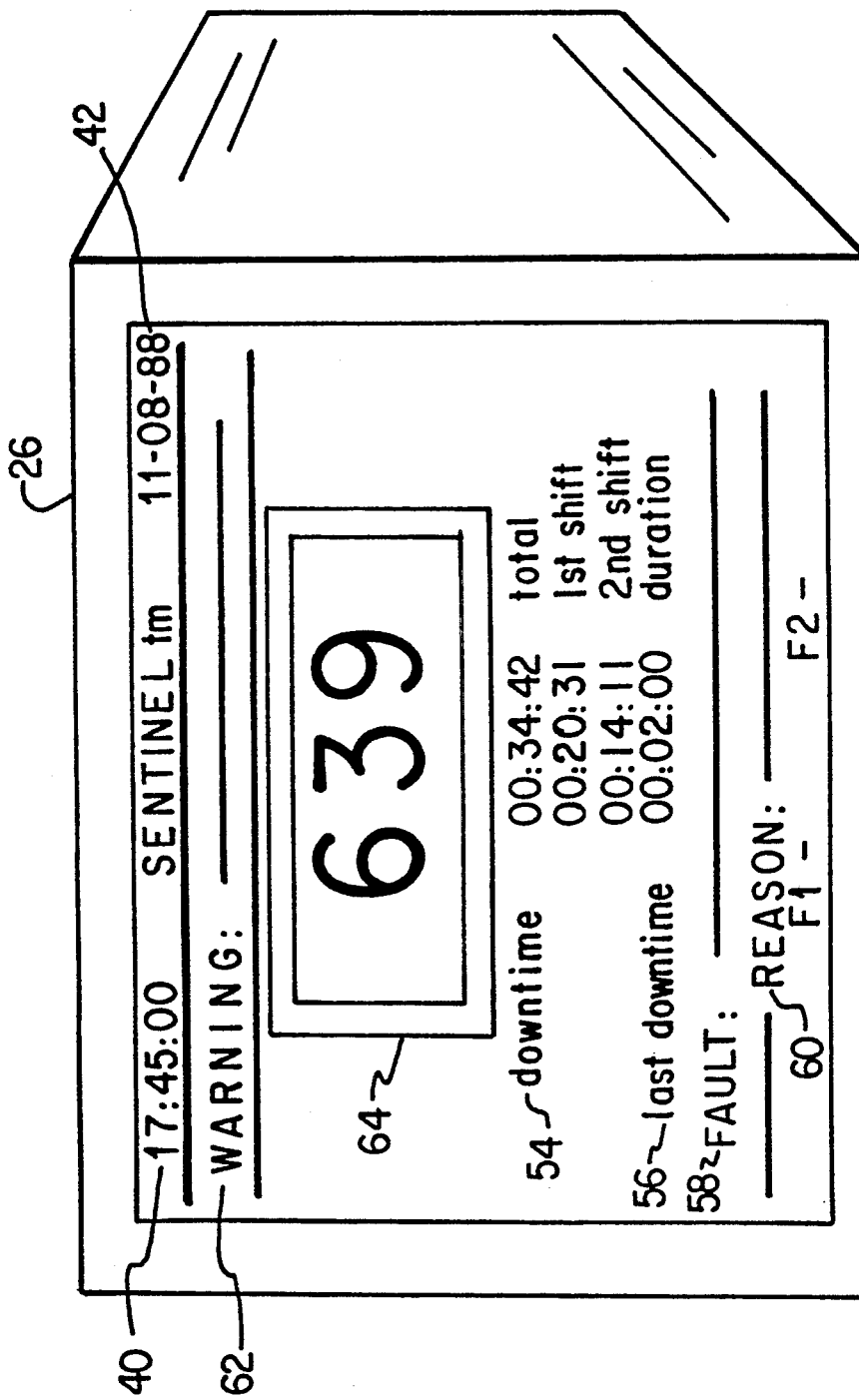

SENTINEL REPORTING SYSTEM

LOG SUMMARY FOR ALL SHIFTS 10/26/88

Total Downtime (Hours) : 6.12

Total Number of Stops : 63

Total Standard Operator Control (Occurrences) : 53

Total Non-Operator Control (Occurrences) : 0

Total Other Component (Occurrences) : 10

SENTINEL REPORTING SYSTEM
DOWNTIME LOG FOR ALL SHIFTS 10/26/88

11/14/88      page 1

| Fault | Cause of Downtime | Started | Duration |
|---|---|---|---|
| Reason | | | |
| A017P | Double backer stop button at head pulley stand was pressed. | 05:04:32 | 00:04:20 |
| 99 | ***** THE OPERATOR FAILED TO ENTER REASON ***** | | |
| A016P | Double backer stop button at glue machine stand was pressed. | 05:09:00 | 00:00:45 |
| 99 | ***** THE OPERATOR FAILED TO ENTER REASON ***** | | |
| A017P | Double backer stop button at head pulley stand was pressed. | 05:10:45 | 00:00:40 |
| 99 | ***** THE OPERATOR FAILED TO ENTER REASON ***** | | |
| H034P | The Upper Stacker Op. Station Stop pushbutton was pressed. | 05:14:57 | 00:07:05 |
| 99 | ***** THE OPERATOR FAILED TO ENTER REASON ***** | | |
| A014P | Double backer stop button at c flute station was pressed. | 05:22:40 | 00:04:47 |
| 99 | ***** THE OPERATOR FAILED TO ENTER REASON ***** | | |
| H029P | The Upper Stacker Computer Console Stop button was pressed. | 05:28:40 | 00:00:50 |
| 99 | ***** THE OPERATOR FAILED TO ENTER REASON ***** | | |

*Fig.5B-2*

| | | | |
|---|---|---|---|
| H027P | The Upper Stacker lift area, operator side stop button was pressed. | 05:30:09 | 00:01:39 |
| 30 | Jam at Down-Stacker (lower level) | | |
| H027P | The Upper Stacker lift area, operator side stop button was pressed. | 06:14:26 | 00:04:41 |
| 30 | Jam at Down-Stacker (lower level) | | |
| H034P | The Upper Stacker Op Station Stop pushbutton was pressed. | 06:38:30 | 00:02:57 |
| 99 | ***** THE OPERATOR FAILED TO ENTER REASON ***** | | |
| G001P | The Stacker 2nd Auxiliary Station E-Stop pushbutton was pressed. | 06:53:12 | 00:03:03 |
| 99 | ***** THE OPERATOR FAILED TO ENTER REASON ***** | | |
| A014P | Double backer stop button at c flute station was pressed. | 07:03:11 | 00:08:10 |
| 09 | Paper break out at C-Flute medium | | |
| H031P | The Upper Stacker 1st Auxiliary Station Stop pushbutton was pressed. | 07:29:16 | 00:07:30 |
| 99 | ***** THE OPERATOR FAILED TO ENTER REASON ***** | | |

SENTINEL REPORTING SYSTEM

11/11/88　　　FREQUENCY OF DOWNTIME FOR ALL SHIFTS 10/26/88　　　1

| Reason | Description | Occurrences |
|---|---|---|
| 99 | ***** THE OPERATOR FAILED TO ENTER REASON ***** | 27 |
| 94 | REASON NOT DEFINED IN LIST | 5 |
| 30 | Jam at Down-Stacker (lower level) | 4 |
| 09 | Paper break out at C-Flute medium | 3 |
| 10 | Paper break out at Double Backer | 3 |
| 55 | Maintenance, B-Flute | 3 |
| 08 | Paper break out at C-Flute liner | 2 |
| 20 | Order not set up properly on dry end (slitter error) | 2 |
| 22 | Order not set up properly on dry end (,auto-aux error) | 2 |
| 27 | Jam at Slitter-Scorer/Auto-Aux | 2 |
| 19 | Paper rolls not ready at Double-Backer | 1 |
| 23 | Order not set up properly on dry end (misc. machine error) | 1 |
| 29 | Jam at Direct Drive Knife (upper level) | 1 |
| 31 | Jam at Down-Stacker (upper level) | 1 |
| 62 | Wet-End order change, C to B | 1 |
| 63 | Wet-End order change, B to C | 1 |

*Fig.5C*

SENTINEL REPORTING SYSTEM

11/11/88        SEVERITY OF DOWNTIME FOR ALL SHIFTS 10/26/88     1

| Reason | Description | Total Time (Hours) |
|---|---|---|
| 99 | ***** THE OPERATOR FAILED TO ENTER REASON ***** | 62.28 |
| 94 | REASON NOT DEFINED IN LIST | 4.95 |
| 30 | Jam at Down-Stacker (lower level) | 1.39 |
| 09 | Paper break out at C-Flute medium | .68 |
| 10 | Paper break out at Double Backer | .64 |
| 55 | Maintenance, B-Flute | .64 |
| 08 | Paper break out at C-Flute liner | .24 |
| 31 | Jam at Down-Stacker (upper level) | .12 |
| 22 | Order not set up properly on dry end (auto-aux error) | .24 |
| 20 | Order not set up properly on dry end (slitter error) | .19 |
| 27 | Jam at Slitter-Scorer/Auto-Aux | .11 |
| 29 | Jam at Direct Drive Knife (upper level) | .05 |
| 23 | Order not set up properly on dry end (misc. machine error) | .04 |
| 62 | Wet-End order change, C to B | .04 |
| 19 | Paper rolls not ready at Double-Backer | .03 |
| 63 | Wet-End order change, B to C | .00 |

*Fig. 5D*

SENTINEL REPORTING SYSTEM

11/11/88        FREQUENCY OF DOWNTIME FOR ALL SHIFTS 10/26/88        1

| Fault | Description | Occurrences |
|---|---|---|
| A016P | Double backer stop button at glue machine stand was pressed. | 15 |
| A014P | Double backer stop button at c flute station was pressed. | 9 |
| A015P | Double backer stop button at b flute 'station was pressed. | 8 |
| G037C | The Lower Stacker lift raise safety circuit was tripped. | 5 |
| A017P | Double backer stop button at head pulley stand was pressed. | 4 |
| H031P | The Upper Stacker 1st Auxiliary Station Stop pushbutton was pressed. | 4 |
| H027P | The Upper Stacker lift area, operator side stop button was pressed. | 3 |
| H034P | The Upper Stacker Op. Station Stop pushbutton was pressed. | 3 |
| A002C | Double backer <cr> relay failure caused stop. | 1 |
| B005P | The shear e-stop button was pressed. | 1 |
| C015P | The Auto-Aux. operator station stop button was pressed. | 1 |
| D043P | The Slitter/Scorer operator station E-stop button was pressed. | 1 |
| F031C | The Knife downstream right hand top cover was opened. | 1 |
| G001P | The Stacker 2nd Auxiliary Station E-Stop pushbutton was pressed. | 1 |
| H029P | The Upper Stacker Computer Console Stop button was pressed. | 1 |
| 7002P | ****** THE SYSTEM POWER WAS TURNED ON ****** | 1 |

Fig. 5E

SENTINEL REPORTING SYSTEM

11/11/88  SEVERITY OF DOWNTIME FOR ALL SHIFTS 10/26/88  1

| Fault | Description | Total Time (Hours) |
|---|---|---|
| A017P | Double backer stop button at head pulley stand was pressed. | .94 |
| A016P | Double backer stop button at glue machine stand was pressed. | .90 |
| A015P | Double backer stop button at b flute station was pressed. | .89 |
| A014P | Double backer stop button at c flute station was pressed. | .72 |
| H031P | The Upper Stacker 1st Auxiliary Station Stop pushbutton was pressed. | .32 |
| H034P | The Upper Stacker Op. Station Stop pushbutton was pressed. | .30 |
| H027P | The Upper Stacker lift area, operator side stop button was pressed. | .22 |
| D043P | The Slitter/Scorer operator station E-stop button was pressed. | .23 |
| G037C | The Lower Stacker lift raise safety circuit was tripped. | .14 |
| Z002P | ****** THE SYSTEM POWER WAS TURNED ON ****** | .13 |
| B005P | The shear e-stop button was pressed. | .05 |
| G001P | The Stacker 2nd Auxiliary Station E-Stop pushbutton was pressed. | .05 |
| C015P | The Auto-Aux. operator station stop button was pressed. | .04 |
| F031C | The Knife downstream right hand top cover was opened. | .03 |
| H029P | The Upper Stacker Computer Console Stop button was pressed. | .01 |
| A002C | Double backer <cr> relay failure caused stop. | .00 |

*Fig. 5J*

METHOD AND APPARATUS FOR ANALYZING MACHINE CONTROL SYSTEMS

BACKGROUND OF THE INVENTION

1. Field of the Invention

This invention relates to an apparatus and method for diagnostic machines in a production line. More particularly, this invention relates to analyzing critical points in production line machines.

2. Description of the Prior Art

Many industrial production lines are comprised of a plurality of processing machines which are tied together. One example is an industrial production line for producing corrugated paper. Corrugated paper is generally produced by using three webs of paper. One web is fluted (the flute) and is glued between two other flat webs of paper. This process can be done using anywhere from 5 to 25 different machines which are mechanically and electrically coupled to one another.

All of the machines used to produce corrugated paper are collectively called a corrugator. A corrugator can be 300 feet long or longer. At one end, paper enters the corrugator from large rolls which are nominally 8 feet wide. The three webs of paper (including the flute) are then glued together, sheared, slitted and scored, and cut to the proper length. Finally, the paper is stacked.

Usually, corrugators are made up of dual machines which can run two or more orders at the same time. Since the paper rolls generally come in 8 foot wide rolls, several orders are set up to best utilize that dimension. For example, one order requiring six foot wide sheets of corrugated paper is run along with an order requiring two foot wide sheets. After being glued, the paper is slit to the proper width. Therefore, it is economically efficient to run more than one order at the same time.

The machines in a corrugator come from a wide variety of vendors and are not precisely matched. Sometimes machines are all manufactured by the same vendor. Corrugators typically run at a speed of approximately 600 feet of paper per minute and the paper tension in the corrugator is important for proper production. Since the machines run at a high rate of speed and since proper paper tension is important throughout the corrugator, the machines must be synchronized with one another.

Also, each machine has its own individual safety interlocks. Since the operation of the entire corrugator depends on the operation of each individual machine in the corrugator, when one machine is shut down by a safety interlock, the other machines should also be shut down. Therefore, the electrical interlocks of the machines are tied to one another so that all machines stop when one interlock is tripped.

Typically, a corrugator takes a crew of 5 members to operate. Each crew member operates one portion of the corrugator. When a problem exists in one machine in the corrugator, a safety interlock may shut that machine off or the operator may push a stop button. When this happens, the entire corrugator is shut down.

When a safety interlock stops a corrugator, confusion among the crew members results because none of them knows which machine has stopped the corrugator or what caused the stop. This can result in what should have been a 30 second stop turning into a ten minute or longer stop which substantially decreases production. For example, where the corrugator is running at 600 ft/min., nine extra minutes of downtime means a loss of more than one mile of corrugated paper production.

When one of the operators pushes a stop button, the corrugator usually coasts to a stop. While the corrugator is coasting, a second problem can arise (such as a jam in one of the machines). The operator of the jammed machine will think that the jam is the problem which caused the corrugator to stop initially. Upon clearing the jam, the operator will restart the corrugator not realizing that the initial condition which stopped the corrugator was that another operator pressed a stop button. This also results in confusion and time delays in getting the corrugator running again.

Another problem which causes the corrugator to stop is an intermittent problem. For example, a relay contact can temporarily open up causing the corrugator to stop but while the corrugator is coasting to a stop, the relay contact could automatically reset itself. Machines in the corrugator don't stop at the same rate, so during the time the corrugator is coasting to a stop, another problem may arise. The operator will see the apparent problem and erroneously determine that it caused the corrugator to stop initially. The intermittent problem having temporarily remedied itself, the corrugator will be restarted and the intermittent problem will never be identified. However, if the intermittent problem is recurring, the corrugator stoppages can be very timely and costly. Typically, corrugators are in dusty, extremely humid and hot environments which contribute to causing intermittent component failures.

Because of the large number of machines (typically from different vendors) and the intertwined safety interlocks involved in a corrugator, finding the exact problem which caused the corrugator to stop running can be very difficult. Each of the different machines has many operator's manuals, schematics and other diagrams which are used to fix the machines. Therefore, when the corrugator stops and the crew does not know which machine has caused the stop, it can take a repairman or serviceman minutes, hours or even days to wade through the necessary documentation to find the problem. Since the corrugated paper industry usually strives for "just-in-time" operation, these delays in finding problems are very expensive.

Another problem which causes corrugators to stop running is that jams can occur when the corrugator shifts from producing corrugated paper for one order to producing another dimension or another quality of corrugated paper for another order. These order changes require adjustments in various machines in the corrugator. When the order change begins and the adjustments have not been made, machine jams and other problems can result in corrugator stoppage. These stoppages are extremely costly in a short order plant where small quantity orders are produced. Corrugators in this type of plant may typically run for only 4 or 5 minutes between order changes. With no warning as to the problems that accompany the order change, operators cannot make the necessary adjustments in time and corrugator downtime is drastically increased.

Until now, manufacturers in the corrugated paper industry have concentrated on making each of the individual machines in the corrugator more technically advanced. However, as yet, no one has addressed the problem of finding the reasons that these highly automated machines fail, fixing the problems and restarting the machines. Therefore, some of the major costs in the corrugated paper industry are those costs which are associated with downtime of the corrugator. One of the primary costs is lost business. The just-in-time nature of the corrugated paper industry requires producers to supply orders on very short notice. If the corrugator is down for a period of hours or days, corrugated paper purchasers will take their business elsewhere.

Another major cost is overtime payments. When the corrugator is down, in order to provide the purchasers with the corrugated paper they have ordered, the producers must run overtime to make up for the corrugator downtime. Yet another cost is the cost of repair and service personnel which are required to find the problems in the corrugator. Due to the complex nature of the machines in the corrugator, it can take service and repair persons weeks to find the problem. All this time will be charged to the producer and that can be very costly.

Several existing diagnostic systems are on the market today. However, they generally simply tie into the programmable controllers of each of the machines in a production line. Therefore, they only provide the diagnostics capability which the programmable controller in each machine provides in the first place if it provides any at all. None of them are able to isolate problems which cause stoppage of the production line down to a component level.

Also, the diagnostic systems on the market today do not provide an operator with the cause of a current downtime period along with a most critical condition keeping the production line from being restarted.

SUMMARY OF THE INVENTION

The diagnostic system of the present invention analyzes conditions of critical points in a corrugator and generates an operator message based on the diagnostics. Sensing means sense the conditions at the critical points in the corrugator and generate critical point signals representative of the conditions. Isolator means receive the critical point signals generated by the sensing means and generates logic signals representative of the critical point signals. The logic signals are isolated from the critical point signals by the isolator means. Controller means receive the logic signals generated by the isolator means and generates a diagnostic based on the logic signals.

BRIEF DESCRIPTION OF THE DRAWINGS

FIG. 4 is a second form of an operator message of the present invention.

FIGS. 5a-5f are report formats generated from information gathered by the diagnostic system of the present invention.

DETAILED DESCRIPTION OF THE PREFERRED EMBODIMENTS

Figure 1:
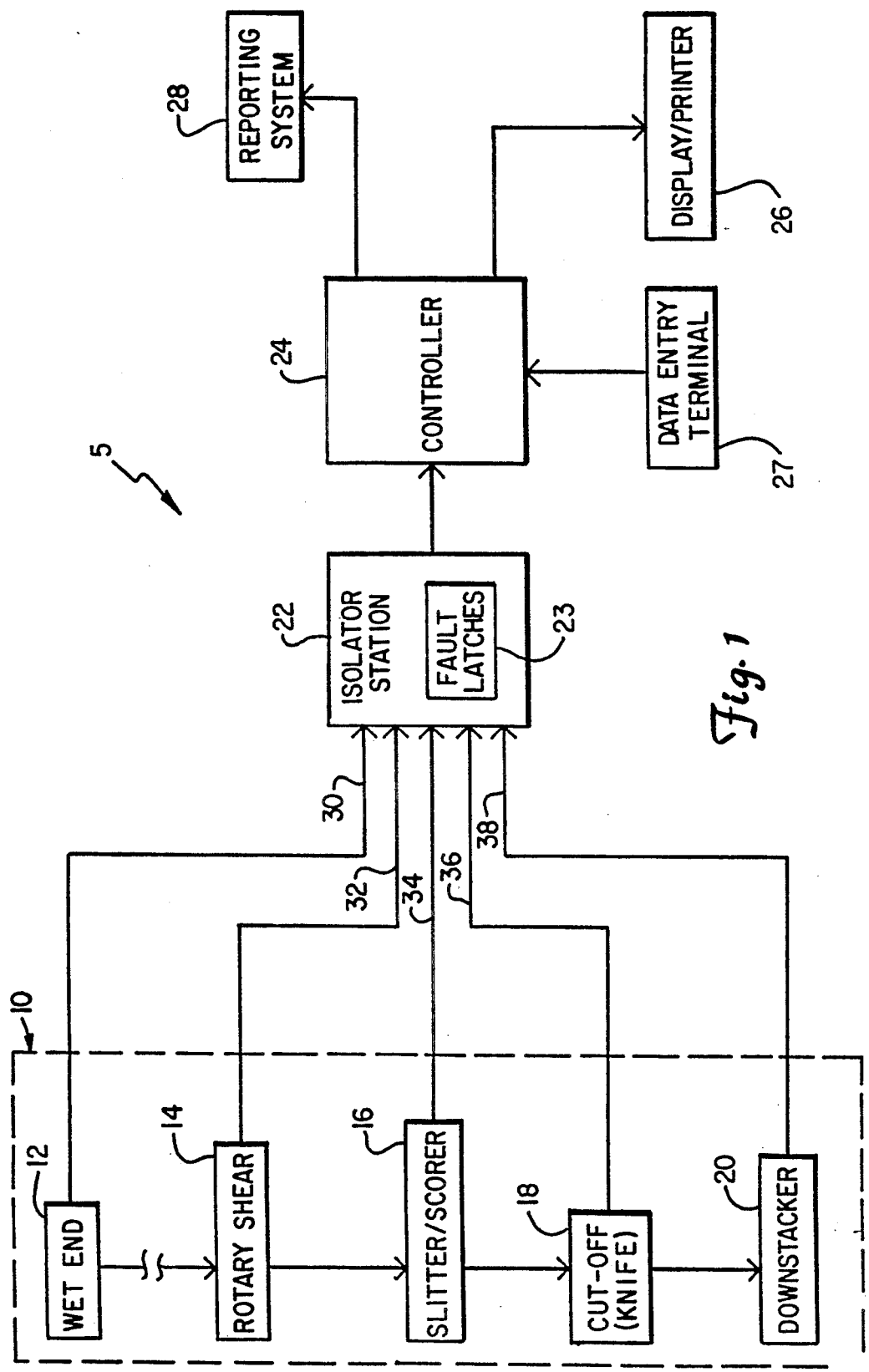
FIG. 1 is a block diagram of the diagnostic system of the present invention.

FIG. 1 is a block diagram of the diagnostic system S of the present invention, which diagnostic operation of corrugator 10. As shown in FIG. 1 corrugator 10 includes wet end 12, rotary shear 14, slitter/scorer 16, cut-off 18 and downstacker 20. Diagnostic system S also includes isolator station 22, fault latches 23, controller 24, display/printer 26, data entry terminal 27, reporting system 28, and conductors 30, 32, 34, 36, and 38.

For simplicity of illustration and discussion, not all of the machines in corrugator 10 are shown. Large rolls of paper are fed into corrugator 10 at wet end 12. When one roll of paper runs out, another is spliced onto the end of the first roll and the paper feed is continuous. Three webs of paper are fed into corrugator 10 at wet end 12. One web is fluted and has starch and water applied to it creating a glue. This web, called a flute, is then glued between the other two webs of corrugated paper and steam cured. The corrugated paper is then fed into rotary shear 14 where the paper is cut widthwise to remove scrap and create a gap in the paper for order changes. The corrugated paper then enters slitter/scorer 16 where it is split lengthwise typically into two webs of corrugated paper which are run through the remainder of corrugator 10 as two separate orders. Slitter/scorer 16 also slits and scores the corrugated paper to the specifications of a particular order. Corrugated paper is typically made into boxes which require these slits and scores. After leaving slitter/scorer 16, the corrugated paper is fed into cut-off (knife) 18 where it is cut to the proper length. Then, the corrugated paper enters downstacker 20 where it is stacked for shipment or delivery. After leaving corrugator 10, the corrugated paper is usually removed to another plant or a different portion of the production facility where it is formed into boxes and glued.

The machines in corrugator 10 are often not from the same vendor and therefore do not precisely match one another. They are often linked by tables or rollers. The machines move the corrugated paper through corrugator 10 at a rate of approximately 600 feet per minute or more. Corrugator 10 is typically at least 300 hundred feet long and it takes approximately 5 crew members to operate it.

The diagnostic system S of the present invention analyzes several critical points on each machine in corrugator 10. The critical points which are analyzed range from simple circuit breakers and emergency stop buttons to steam level monitors, water flow rate monitors and starch viscosity monitors. The critical points which are analyzed in corrugator 10 are substantially anything which, when not in the proper condition, is capable of stopping corrugator 10.

Each of the sensors on each machine in corrugator 10 produce a signal which is representative of the current state of that particular critical point. For example, where a circuit breaker on slitter/scorer 16 is monitored, the presence of 120 volts AC indicates that the circuit breaker is closed and the absence of 120 volts AC indicates that the circuit breaker is open. The signals representative of the current states of the critical points which are analyzed are critical point condition signals and are provided to isolator station 22, in this preferred embodiment, by being hard wired via conductors 30, 32, 34, 36, and 38. For simplicity, conductors 30, 32, 34, 36 and 38 are shown as single lines in FIG. 1, but each typically contains multiple lines—one line or set of lines (twisted pair) for each point within the machine which is analyzed.

Isolator station 22 optically isolates the critical point condition signals received from corrugator 10 and produces logic signals representative of the critical point condition signals. When a fault condition exists and causes corrugator 10 to stop, the logic signal associated with the critical point causing the fault condition changes states and is latched in fault latches 23. Isolator 22 provides the logic signals and latch outputs from fault latches 23 to controller 24. The optical isolation performed by isolator station 22 not only protects controller 24 from electrical transients, accidental short circuits and high voltages, but also prevents controller 24 from interfering with the performance of the machines in corrugator 10 which are being analyzed.

Controller 24 periodically polls the logic signals produced by isolator station 22 (e.g. approximately once every 0.25 sec.) and analyzes that information to determine the current state of the critical points in corrugator 10. Controller 24 determines that a fault condition exists when the condition of any critical points which are analyzed in corrugator 10 have caused corrugator 10 to stop. For instance, if an electrical interlock in downstacker 20 has caused a circuit breaker to open thereby shutting down corrugator 10, the logic signal associated with that circuit breaker will change state and be latched in fault latches 23 at isolator station 22. Therefore, controller 24 will "see" which circuit breaker has tripped, will generate a corresponding operator message and will provide it to the operator at display/printer 26. The information is also uploaded to reporting system 28 and is processed and analyzed and included in one of a number of report formats.

Similarly, where a crew member in charge of rotary shear 14, for instance, sees a jam and manually pushes an emergency stop button bringing corrugator 10 to a stop, the logic signal associated with the emergency stop button will change states and be latched in fault latches 23 at isolator station 22. Hence, controller 24 will "see" that this particular emergency stop button has stopped corrugator 10. Controller 24 will then generate an operator message on display/printer 26 thereby eliminating any confusion resulting from the stoppage among the crew members along the 300 foot production line. In that case, the crew member which pushed the emergency stop button will enter a reason at data entry terminal 27 indicating why the stop button was pushed. This allows controller 24 to upload the operator's reason to reporting system 28 to be included in a production report.

Table 1 shows one particular example of machines used in a corrugator. Also, Table 1 contains a list of operator messages associated with each point analyzed on the double backer and upper knife in the corrugator. Note that there are two messages listed. One message is displayed if the corresponding critical point has caused an initial fault and the other is displayed as a current condition message.

TABLE 1

| Machine | Manufacturer |
| --- | --- |
| Double Backer | S & S |
| Rotary Shear | Marquip, Inc. |
| Auto Auxilliary Scoring Section | Marquip, Inc. |
| Slitter/Scorer | Marquip, Inc. |
| Lower Knife | Marquip, Inc. |
| Upper Knife | Marquip, Inc. |
| Lower Downstacker | Marquip, Inc. |
| Upper Downstacker | Marquip, Inc. |
| Machine Interface | Alliance Technical Services, Inc. |

DOUBLE BACKER OPERATOR MESSAGE

A001C
The double backer start will not start due to a Failure to the dynamic brake contactor or TD delay.
Contact maintenance!
The double backer dynamic brake contactor or T.D. Failed.

A002C
Fault message only

Double backer [cr] relay failure caused stop

A003E
Fault message only
Double backer belt-lifter switch was switched to [MANUAL]

A004E
The double backer belt-lifter switch is set on [manual]. in order for the Double backer to start, The switch must be in [auto].
If the switch is not in [manual], contact maintenance!
The Double Backer belt-lifter switch was turned to [manual]

A005P
The line is ready to start, press the double backer Start button. If the line won't start, the fault Message should indicate why.
Contact maintenance if the double backer won't start.
This fault should never be logged - - - A005P A006C
The double backer belt lifter auto-manual selector Switch has failed.
Contact maintenance!
This message should never be logged - - - A006C A007C
The double backer start button has been pressed. the Double backer should start when the belts are nearly Down. if the double backer does not start, contact Maintenance! the fault message should indicate Component failure. if the double backer does not Start, lss could be defective A008C
The double backer mainline drive motor thermal is Tripped. contact maintenance immediately!

The double backer mainline drive motor thermal Tripped.

A009C
The double backer drive control relay (cr) has failed.
Contact maintenance immediately!

The double backer drive control relay (cr) failed.

A010C
The double backer jog button at the glue machine is Defective. the normally closed contact is open.
Contact maintenance!
The double backer job button at the glue machine Failed.

A011C
The double backer job button at the main belt head Pulley stand is defective. the normally closed Contact is open. contact maintenance!

The double backer job button at the head pulley stand Failed.

A012C
The double backer low speed relay (lsr) contact is Open. this diagnostic should appear if Single Machine analysis is used while the Double Backer is Running.

The double backer low speed relay (lsr) contact Failed.

A013C
The double backer is not ready to start because the Dry-end ready contact in the double backer stop Circuit is open.

This message should appear only when single machine Analysis is used.

This message should never be logged - - - A013C

A014P
The double backer stop push button at the c flute Operator stand is open. if the button is not Depressed contact maintenance!

Double backer stop button at c flute station was pressed.

A015P
The double backer stop push button at the b flute Operator stand is open. if the button is not Depressed contact maintenance!

Double backer stop button at b flute station was Pressed.

A016P
The double backer stop push button at the glue Machine stand is open. if the button is not Depressed contact maintenance!

Double backer stop button at glue machine stand was Pressed.

A017P
The double stop push button at main belt head pulley Stand is open. if the button is not depressed Contact maintenance!

Double backer stop button at head pulley stand was Pressed

A018C
The double backer is not ready to start because the Dry-end e-stop contact in the double backer e-stop Circuit is open. this message should appear only When single machine analysis is used.

This message should never be logged - - - A018C

A019P
The double backer e-stop push button at the glue Machine stand is open. if the button is not Depressed contact maintenance!

Double backer e-stop at the glue machine was pressed.

A020C
A double backer belt lifter motor thermal (lnol) is Tripped. contact maintenance!

A double backer belt lifter motor thermal (lnol) Tripped

A021C
A double backer belt lifter motor thermal (lnol) is Tripped. contact maintenance!

A double backer belt lifter motor thermal (lnol) Tripped

A022C
The double backer control circuit fuse (cfu) has Blown. contact maintenance!

The double backer control circuit fuse (cfu) blew

A023C
No power is sensed at the double backer drive control Circuit. check to see if the drive is on. if the Drive will not start, contact maintenance! double Backer drive was turned off or failed while running

A024P
The double backer e-stop push button dry-end contact Is open. if the button is not depressed, contact Maintenance!

The double backer e-stop push-button dry-end contact Opened

A025P
The double backer is being jogged.

The double backer was jogged while ready to start

A026C
The Double Backer BELT NEARLY DOWN limit switch (LSS) Or MAIN CONTROL RELAY (CR) has failed. The belts Will not latch down.
Contact maintenance!
The Double Backer belts won't stay down, contact Maintenance!

A027C
The double backer glue station is turned off. The Glue station must have power in order for the line to Power up If the disconnect is on, contact maintenance!
The double backer glue station lossed power.

A028C
The Double Backer is coasting to a stop.
This message should change when the Slow Speed limit Switch is tripped.
This message should not be logged - - - A028C

UPPER KNIFE OPERATOR MESSAGES

F001C
The power feeding the upper control circuit is off. Check the main disconnects of the knife. Contact the maintenance if disconnects are on.

The 480 v. supply to the control circuit transformer was lost.-upper

F002C

The circuit breaker (CB-7) of the UPPER level has tripped. The breaker is located in the right hand knife cabinet.
Contact maintenance.
The circuit breaker (CB-7) of the upper level tripped.

F003C
The Upper Knife is not ready.
The Knife computer interlock relay (CR-80) has failed.
Contact maintenance!
The Knife computer interlock relay (CR-80) failed.

F004C
The Upper Knife velocity monitor card is preventing control power from enabling. Contact maintenance!
The Upper Knife velocity monitor card caused an E-stop.

F005P
The control lockout keyswitch on the knife computer console is turned to LOCKOUT.

The control lockout on the knife console was turned to LOCKOUT.

F006P
The control lockout keyswitch at the knife (Operator Side) is turned to LOCKOUT.

The control lockout at the knife was turned to lockout.

F007P
The knife's emergency stop pushed button is pressed.
If the button is not depressed, contact maintenance.

The knife's emergency stop push button was pressed.

F008C
The knife's customer e-stop contact of the upper level is open.
Contact Maintenance!

The knife's customer e-stop contact of the upper level opened.

F009P
The knife's normal stoppush button is pressed.
If the button is not depressed, contact maintenance.

The knife's normal stop pushbutton was pressed.

F010P
The Upper Knife control power push-pull button contact is open.
If the button is not depressed, contact maintenance.

The Upper Knife control power pushbutton was pressed.

F011C
The Upper Knife computer controlled E-stop relay (CR-89) is open.
This contact should open after any E-stop but should close again.
If this message does not change, contact maintenance.

The Upper knife computer controlled E-stop relay (CR-89) opened.

F012P
The Upper Knife control power is not on.
Control Power should enable.
If control power will not enable, contact maintenance.
Upper Knife control power turned off when CR-1 failed.

F013C
The SENTINEL is in single machine analysis of the upper knife and upper auto will not come on because the upper stacker ready input is off.
This message should never appear - - - F013CF014E
Upper Knife auto will not turn on because the upper rolls are raised.
If the rolls are not raised, contact maintenance.

This message should never appear - - - F014E

F015C
The Upper Knife is not ready.
A jam is sensed at the exit rolls.
Contact maintenance if no jam is present.
A jam in the upper knife caused the stop.

F016C
Upper Knife Auto is off. There is no Air Flow sensed through the Upper Knife.
Contact Maintenance!

The Upper Knife Auto turned off due to NO AIR FLOW condition.

F017C
The Upper Knife Auto is not on, the Oil Level is low!!!
Contact maintenance!

The Upper Knife Auto turned off due to Low Oil condition.

-F018C-
The Upper Knife Auto is not on. The excessive line speed output is on!
Contact Maintenance! The Upper knife excessive speed was on too long causing the stop.

-F019C-
This current condition should never appear - - - F019C.

The upper knife auto disabled. Too many cyl. racks may have disabled.

F020P
This current condition message should never appear - - - F020P.

The upper knife auto disabled when the pushbutton was pressed.

F021C
The Upper Knife power supply (P.S.-1310) has failed.
Contact maintenance!

The Upper Knife power supply (P.S.-1310) failed.

F022C
There is no power coming from the upper knife power supply 136.
Contact maintenance!

The upper knife power supply - 136 lost power.

F023C
There is no power coming from the upper power supply - 134.
Contact maintenance!
The power from the upper power supply - 134 was lost.

F024C
The Upper Knife Auto is off. Auto should enable when the button is pressed.
Contact maintenance if Auto will not come on.

Upper Knife Auto turned off, Rack #5 failure or computer failure.

F025E
Upper B.E.C. failure/crash.
The Upper Knife manual interlock was pulled while running in MANUAL.

F026E
This current condition should never appear - - - F026E

The Upper Knife manual interlock was pulled in while running in MANUAL.

F027E
The CRT/Manual switch contact is open and the Switch is in MANUAL.
Check the position of the switch, ensure it is firmly in position.
The Knife's CRT/Manual switch opened, knife was not ready for CRT.F028C
The Upper Knife computer E-stop relay (CR-61) contact is open.
This contact remains open after an E-stop for approximately 20 seconds.
If this message never changes, contact maintenance.
The Upper Knife computer E-stop relay (CR-61) contact opened.

F029C
The Knife Ready circuit is open due to a failure of relays CR88 and/or CR98. Contact maintenance!

The Knife Ready contact (Relays 88 and 98) failed.

F030C
The Knife's door sense relay (CR 90) is not energizing even though all limit switches are made.

Contact maintenance.
The knife's door sense relay (CR 90) failed.

F031C
The knife right hand (looking downstream) top cover, farthest from the stacker, is open or the limit switch is tripped.

The Knife downstream right hand top cover was opened.

F032C
The Knife left hand (looking downstream) top cover, farthest from the stacker, is open or the limit switch tripped.
The Knife upstream left hand top cover was opened.

F033C
The Upper Knife infeed rollout section is pulled out or is not closed all the way.

The Upper Knife infeed rollout section was pulled out.

F034C
The Lower Knife infeed rollout section is pulled out or is not closed all the way.

The Lower Knife infeed rollout section was pulled out.

F035C
The knife's left hand (looking downstream) top cover closest to the stacker is open or the limit switch is tripped.

The knife's upstream left hand top cover door was opened.

F036C
The knife's right hand (looking downstream) top cover closest to the stacker is open or the limit switch tripped.

The knife's upstream right hand top cover door was opened.

F037C
The Knife right hand side (looking downstream) left door, is open or the limit switch is tripped.

The Knife right hand side (looking downstream) left door opened.

F038C
The Knife left side (looking downstream) right door is open or the limit switch is tripped.
The Knife left side (looking downstream) right door opened.

F039C
The Knife left side (looking downstream) left door is open or the limit switch is tripped.

The Knife left side (looking downstream) left door opened.

F040C
The Knife right side (looking downstream) right door is open or the limit switch is tripped.

The Knife right side (looking downstream) right door opened.

F041C

The Knife is not ready due to a blown fuse.
Fuse 53FU in the sense doors circuit has failed.
Contact maintenance!
Fuse 53FU of the knife failed.

F042C
The Knife is not ready due to a blown fuse.
Fuse 52FU in the sense doors circuit has failed.
Contact maintenance!
Fuse 52FU of the knife failed.

F043C
The Knife air conditioning interlock relay (CR BOA) is open.
The relay has failed.
Contact maintenance.
The Knife air conditioning interlock relay (CR BOA) failed.

F044C
The Knife air conditioner interlock circuit is preventing the Knife from being ready. The circuit breaker CB-2 has failed.
Contact maintenance.
The Knife Air Conditioner circuit breaker tripped.

F045C
The Knife air conditioner interlock circuit is preventing the Knife from being ready. There is no power sensed to this circuit.
Contact maintenance!
The Knife Air Conditioner incoming power was turned off.

F046E
The Knife is in MANUAL mode, switch to CRT if desired.
To continue in MANUAL, either push in the Upper Interlock or turn on Upper Control Power and Auto.
This message should not be logged - - - F046E.

F047C
Single Machine Diagnostic.
The Upper Knife is ready (Control Power and Auto are on).
This single machine diagnostic should never be logged - - - F047.

F048C
spare message

F049C
The Upper Knife Ready output is off but all conditions are met.
Call maintenance!

Figure 2A:
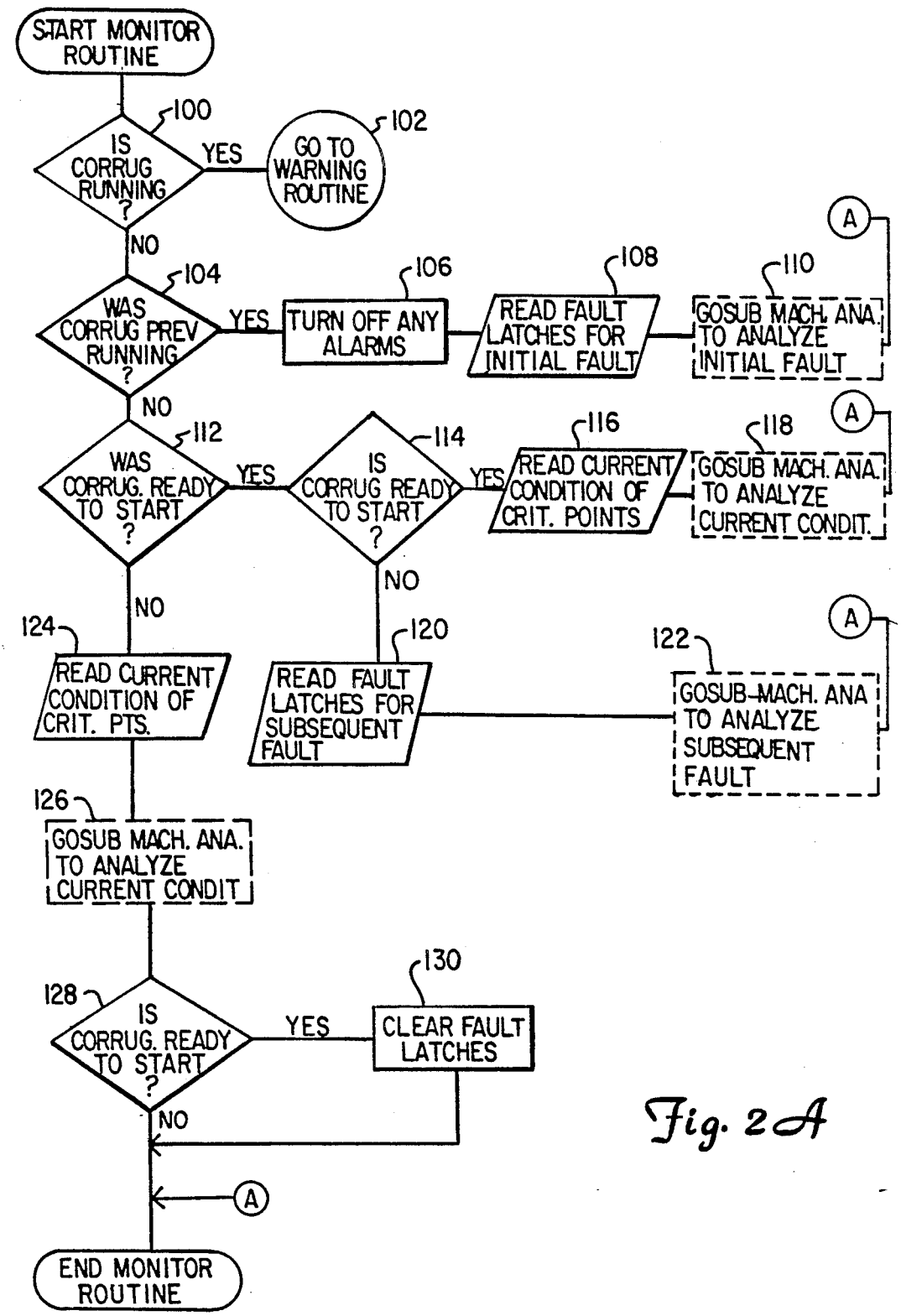
FIGS. 2a-2c are flow charts showing various routines performed by the diagnostic system of the present invention.

The Upper Knife Ready output failed.
FIG. 2a is a flow chart showing one preferred embodiment of the operation of controller 24 when executing a diagnostic routine. The first determination made by controller 24 is whether corrugator 10 is running or whether it has been stopped. If it is running, controller 24 goes to a warning routine where various warning points are analyzed. This is indicated in blocks 100 and 102. If corrugator 10 is not running, controller 24 determines the previous state of corrugator 10. If corrugator 10 was previously running then an initial fault condition has just occurred which has stopped corrugator 10 and which must be identified. Controller 24 turns off any alarms which are on and reads the state of fault latches 23 at isolator station 22 as indicated in blocks 104, 106 and 108. After reading the state of fault latches 23, controller 24 jumps to a machine analysis subroutine (which will be described in more detail later) to analyze the data retrieved from fault latches 23 to determine what the initial fault was which stopped corrugator 10. This is shown in block 110. After analyzing the initial fault, controller 24 jumps out of the diagnostic routine.

If corrugator 10 was not previously running, then the initial fault condition has already been identified on a previous run through of the diagnostic routine. Controller 24 next determines whether corrugator 10 was ready to start before this run through of the diagnostic routine by checking a previous condition variable which was set by controller 24. If it was ready, controller 24 determines whether corrugator 10 is presently ready to start. If corrugator 10 is presently ready to start, controller 24 reads the current state of the critical points which are analyzed at isolator station 22 then jumps to a machine analysis routine to analyze a current condition of corrugator 10 for any fault conditions. Once the analysis is complete, controller 22 jumps to the end of the diagnostic routine. This is indicated in blocks 112, 114, 116 and 118.

However, if corrugator 10 was ready to start before this run through of the diagnostic routine, and corrugator 10 is no longer ready to start, then corrugator 10 has gone from a running condition to a stop condition to a ready to start condition and back to a stop condition. This is defined as a subsequent fault. A subsequent fault is one which occurs after an initial fault has caused corrugator 10 to stop running and after corrugator 10 has returned to a ready to run state. Therefore, controller 24 reads the state of fault latches 23 for a subsequent fault. Next, controller 24 jumps to a machine analysis routine to analyze the data retrieved from fault latches 23 to determine the nature of subsequent fault conditions. Then, controller 24 jumps to the end of the diagnostic routine. This is shown in blocks 112, 114, 120 and 122.

If the previous condition variable indicates that before this run through of the diagnostic routine, corrugator 10 was not ready to start, then the current state of the critical points is keeping corrugator 10 from being restarted. Therefore, controller 24 reads the current state of the critical points (as opposed to fault latches 23 which are read to determine initial and subsequent faults) at isolator 22. Next, controller 24 jumps to a machine analysis subroutine to analyze the current state of the critical points in order to determine what must be done for corrugator 10 to be restarted. There may be a number of critical points which have a current state that is keeping corrugator 10 from being restarted. However, many of these may depend on only one critical point located upstream of them. Therefore, controller 24 filters through the current states of the critical points to determine a current condition which is the most critical condition which must be remedied to restart corrugator 10 (i.e., the logical first step to be taken in restarting corrugator 10). After the machine analysis subroutine is run, controller 24 determines whether corrugator 10 is now ready to start. If it is, fault latches 23 are cleared and controller 24 jumps out of the diagnostic routine. If corrugator 10 is not ready to start, then there is yet another current state of the critical points which is keeping corrugator 10 from being restarted. Therefore, controller 24 comes to the end of the diagnostic routine which will be rerun in approximately 0.25 sec. at which time the current state keeping corrugator 10 from being restarted will be identified. These steps are shown in blocks 124, 126, 128 and 130. The effect of these steps is to give the operator an updated indication of the current condition of corrugator 10 and the next step to take in restarting corrugator 10.

Figure 2B:
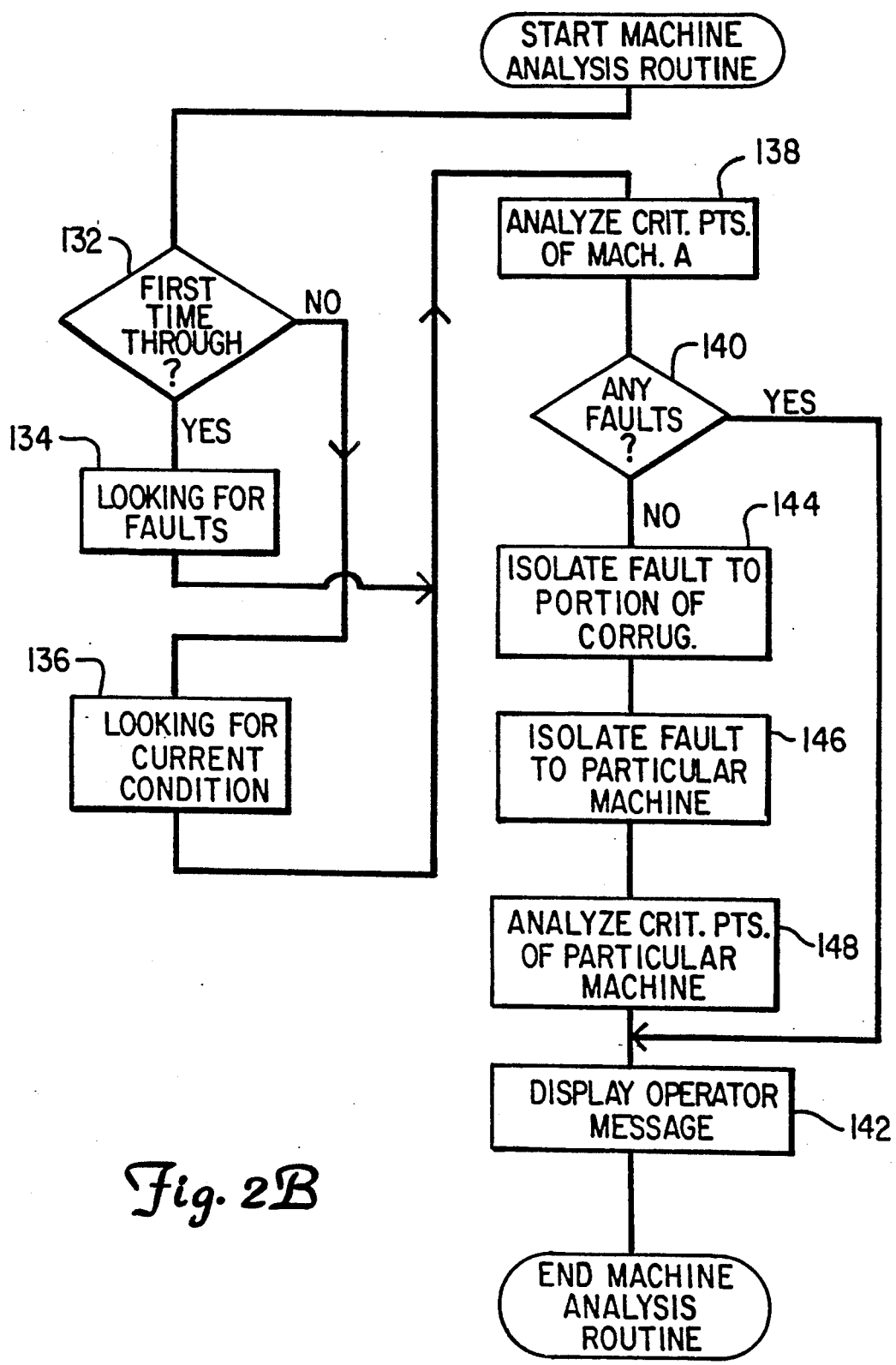

FIG. 2b shows a flow chart for the machine analysis routine discussed in conjunction with FIG. 2a. The machine analysis routine analyzes information retrieved from isolator station 22 and fault latches 23 and returns a fault code identifying and pinpointing the reasons for stopping corrugator 10. After controller 24 enters the machine analysis routine, it first determines whether it is looking for an initial or subsequent fault, or whether it is looking for the current condition of the critical points. This is done by determining whether it has been through the machine analysis routine since the initial fault has caused corrugator 10 to stop running and been remedied. If it has, it has already identified the faults and is looking for current conditions. If not, it is either looking for the initial fault or a subsequent fault. The difference is that if it is looking for faults, it reads fault latches 23. If, on the other hand, it is looking for the current condition of the critical points, it reads the current state of those points at isolator station 22. This is shown in blocks 132, 134 and 136.

After determining whether it is looking for fault or current conditions, controller 24 analyzes the critical points of one machine (e.g., machine A) in corrugator 10. Then, based on the machine logic, controller 24 determines whether there are any faults in machine A. If there are, controller 24 displays an operator message describing the fault and then jumps out of the machine analysis routine. This is shown in blocks 138, 140, 142.

If there are no faults in machine A, controller 24 isolates the fault to a portion of corrugator 10. For instance, the wet or dry end of corrugator 10 (e.g. the end of corrugator 10 where the paper is glued or the end where it is cut and stacked). Next, controller 24, based on the machine logic, isolates the fault to a particular machine in corrugator 10 and then analyzes the critical points of that particular machine to determine the exact critical point causing the fault condition. After pinpointing the fault condition, controller 24 again displays an operator message at display/printer 26 describing the fault and how to remedy the fault. This is shown in blocks 142, 144, 146 and 148.

Controller 24 may also be set to run the machine analysis routine for particular machines in corrugator 10 ignoring the other machines. This is useful when one machine is stopped for routine maintenance and the operator desires to troubleshoot another machine.

Figure 2C:
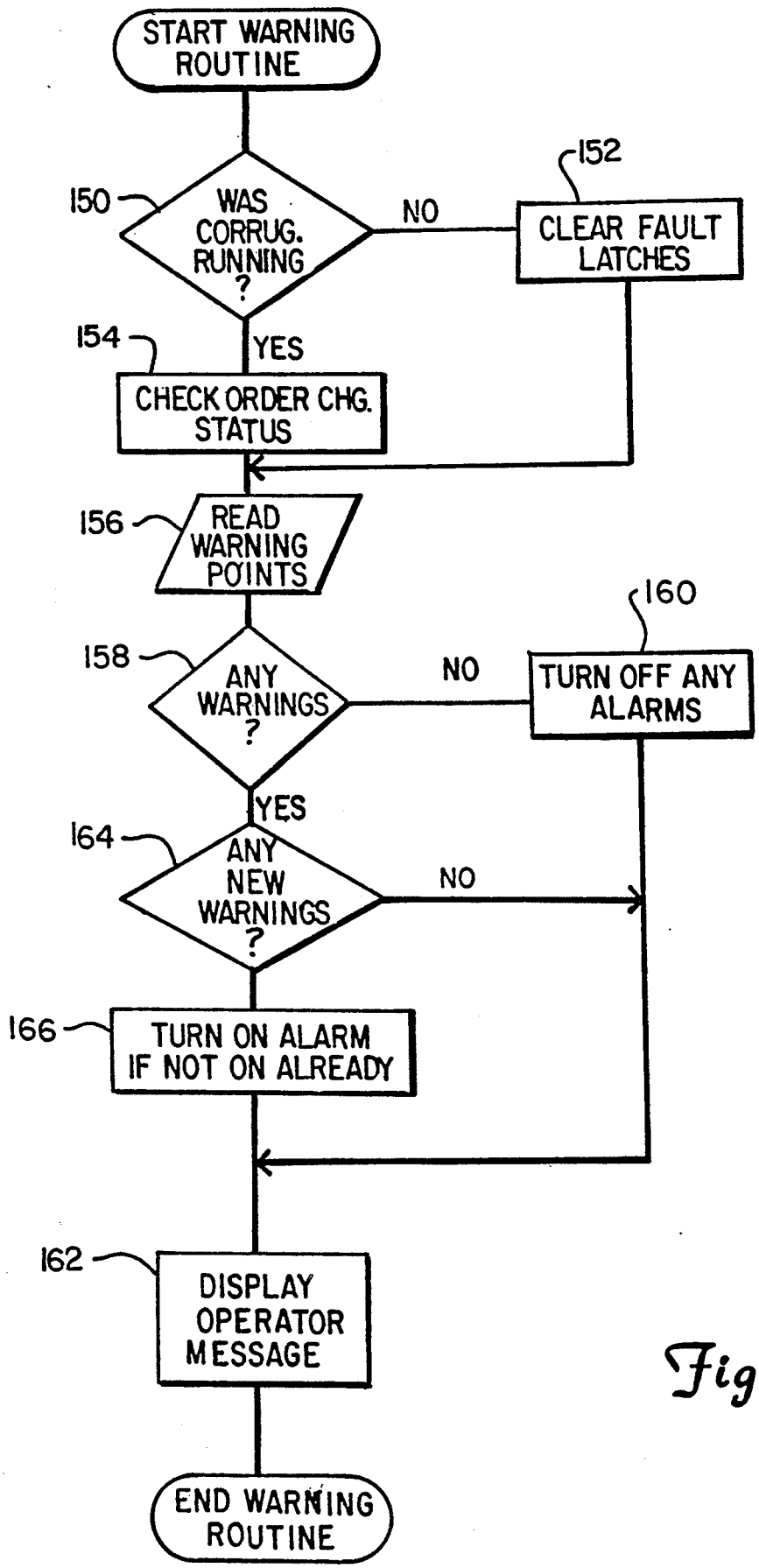

FIG. 2c is a flow diagram showing the warning routine which is briefly discussed in conjunction with FIG. 2a. In the diagnostic routine of FIG. 2a, controller 24 first determines whether corrugator 10 is presently running. If it is, controller 24 jumps to the warning routine. Controller 24 determines whether corrugator 10 was previously running. If not, then corrugator 10 has just been restarted and fault latches 23 are cleared. If corrugator 10 was previously running, controller 24 checks an order change status to determine whether machine adjustments must be made for an upcoming order change. This is shown in blocks 150, 152 and 154.

After the order change status is checked, controller 24 reads conditions of critical points in corrugator 10 which constitute warning points. These points are anything which could cause an operator to stop corrugator 10 if their condition is not changed. Based upon the condition of the warning points, controller 10 determines whether any warnings are necessary. If not, controller 24 turns off any alarms which may be on, removes any message for the operator which may be present indicating that warnings are present and jumps out of the warning routine. This is shown in blocks 156, 158, 160 and 162.

If the conditions of the warning points indicate that warnings are necessary, controller 24 determines whether any new warnings have been generated. If not, controller 24 simply displays a warning message for the operator and jumps out of the warning routine. However, if new warnings are required, controller 24 turns on corresponding alarms, if they are not already on, and then displays a warning message for the operator and jumps out of the warning routine. This is shown in blocks 162, 164 and 166.

Figure 3:
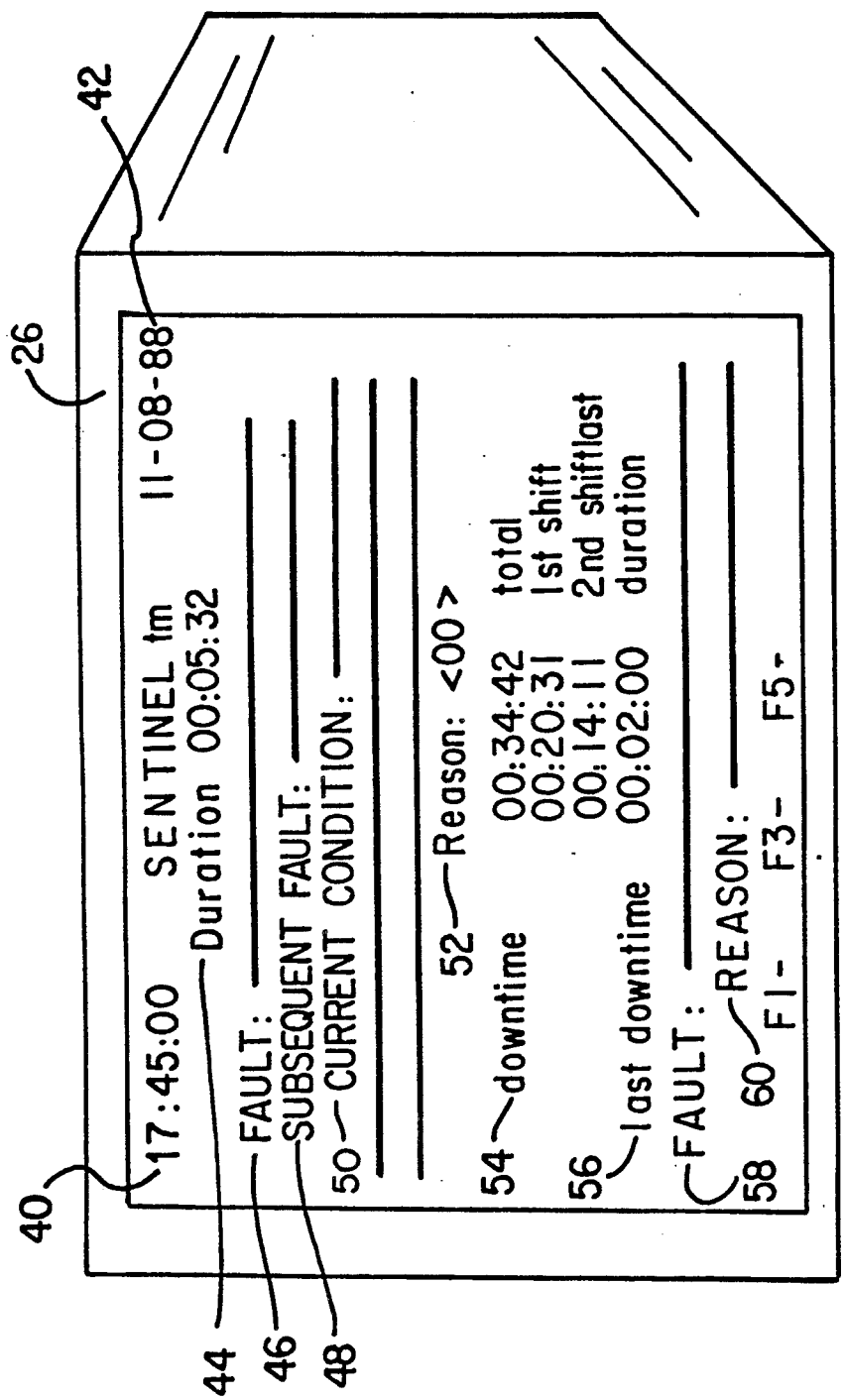
FIG. 3 is one form of an operator message of the present invention.

FIG. 3 shows one preferred embodiment of an operator message format displayed at display/printer 26 when controller 24 has detected a fault condition and corrugator 10 has been stopped. Time and date displays 40 and 42 display the current time and current date, respectively. Duration indicator 44 shows the duration of time that corrugator 10 has been down. This time is stopped when corrugator 10 is restarted.

Fault indicator 46 shows the nature of the initial fault which has caused corrugator 10 to stop.

Subsequent fault indicator 48 displays a subsequent fault condition which has occurred after that displayed by fault indicator 46.

Current condition indicator 50 displays the current condition of corrugator 10. To analyze initial and subsequent fault conditions, controller 24 reads the state of fault latches 23. To analyze the current condition of corrugator 10, controller 24 reads the current condition of the critical points at isolator station 22. Where multiple fault conditions exist, and are preventing corrugator 10 from being restarted, the most critical condition is displayed at current condition indicator 50. Therefore, as the operators or servicepersons are fixing the faults, current condition indicator 50 will be updated to display the next most critical fault condition which is keeping corrugator 10 from being restarted. Current condition indicator 50, therefore, is particularly helpful in stepping an operator through a logical progression of steps which must be taken to remedy the fault conditions keeping corrugator 10 from being restarted.

The combination of current condition indicator 50 and fault indicator 46 is particularly helpful, when an intermittent problem causes corrugator 10 to stop. For example, where a relay contact in a safety interlock temporarily opens, causing corrugator 10 to stop, and then immediately recloses, while corrugator 10 is coasting to a stop and before the operators have noticed that it has been stopped, a jam in downstacker 20 could occur causing an operator to push an emergency stop button. Without diagnosticing system S of the present invention, the operator would expect that the jam in downstacker 20 caused corrugator 10 to stop, would clear the jam, and would try to restart corrugator 10. Where the relay contact fault which originally stopped corrugator 10 is an intermittent problem, it may be weeks or months before the operators or maintenance crews locate that problem. This can result in very costly downtime in the interim.

However, with diagnostic system S of the present invention, the relay contact fault, even though it is intermittent, is latched in fault latches 23 at isolator station 22 when its corresponding logic signal changes states. Consequently, it is "seen" by controller 24 and is also displayed at fault indicator 46. Any current condition keeping corrugator 10 from being restarted, such as a jam at downstacker 20, would be displayed in current condition indicator 48. Therefore, the operators waste no unnecessary time restarting corrugator 10 until the intermittent problems are fixed.

Reason indicator 52 displays an operator-entered reason why corrugator 10 was stopped. Since standard operator control shutdowns most commonly stop corrugator 10 or keep it from being restarted, it is important to know why the standard operator control shutdowns occur. For example, where an operator has a plant meeting, goes on break or notes bad or low quality paper entering his or her machine and presses an emergency stop button, the operator enters a two digit code in reason indicator 52 at data entry terminal 27. The two digit code is representative of the operator defined reason for the downtime. This information is particularly helpful in generating production reports.

Downtime indicator 54 displays the cumulative total downtime of corrugator 10 for the entire day and also the total downtime for each shift during the day. Downtime display 54 is updated each time corrugator 10 is restarted.

Last downtime display 56 displays the duration of the most recent downtime of corrugator 10. Last downtime display 56 is updated when corrugator 10 is successfully restarted. The fault condition which caused the most recent previous downtime is displayed at fault indicator 58. Fault indicator 58 is also updated when corrugator 10 has been successfully restarted. Similarly, reason indicator 60 indicates the operator-entered reason for the last downtime of corrugator 10 and is updated when corrugator 10 is successfully restarted.

Controller 24 not only produces the operator message shown in FIG. 3 when a fault condition is detected, but it also gives the operator access to help screens which are selectable by the operator. The help screens are comprised of information which is relevant to the fault condition surrounding the downtime of corrugator 10. Typically the help screens are schematic diagrams showing the circuitry causing the fault condition, pictures or sketches showing the physical location of the fault condition, part numbers and print numbers corresponding to parts or document prints associated with the fault condition and tutorial text describing how to remedy the fault condition.

In this preferred embodiment, when the operator message shown in FIG. 3 is displayed, the help screens for the fault condition indicated in fault indicator 46 will be displayed when the operator presses "F3" at data entry terminal 27. Also, if the operator has further questions concerning the problem displayed in current condition indicator 50, the operator can retrieve the help screens associated with the current condition displayed in current condition indicator 50 by pressing "F5". Controller 24 can be programmed to display these help screens when any convenient command is given at data entry terminal 27.

If the operator enters "F1", in this preferred embodiment, the previous 7 fault conditions, subsequent fault conditions and operator-entered reasons will be displayed on display/printer 26. The help screens for these fault conditions are also retrievable. Also, an editing function allows the operator to edit the operator-entered reasons but not the faults.

When corrugator 10 has been successfully restarted, and when the operator has entered the two digit code in reason display 52 for the last downtime, controller 24 displays the operator message shown in FIG. 4 at display/printer 26. Time display 40, date display 42, downtime indicator 54, last downtime display 56, fault indicator 58 and reason indicator 60 are identical to those shown in FIG. 3 except that they have been updated accordingly.

Warning indicator 62 will warn the operator about any condition at a critical point which is being analyzed in corrugator 10 which could result in the operator stopping corrugator 10 if it is not remedied. For example, where slitter/scorer 16 is set up to run a particular order, and an order change is approaching in which slitter/scorer 16 needs to be adjusted in order to run properly, warning indicator 62 will warn the operator of this potential problem. If the operator adjusts slitter/scorer 16 properly before the order change, there will be no resulting excess downtime and, hence, no loss of production. Also, in this preferred embodiment, when a warning is displayed at warning indicator 62, controller 24 also causes an audible alarm to be triggered to assure that an operator realizes that corrugator 10 will go down unless some adjustments are made.

If more than one warning is generated by controller 24 at one time, that will be indicated in warning display 62. Then, by pressing "F2", in this preferred embodiment, the operator will see a display of any other warnings.

When corrugator 10 is up and running properly, speed display 64 displays the speed at which corrugator 10 is producing corrugated paper. In FIG. 4, speed indicator 64 shows that corrugator 10 is producing corrugated paper at a rate of 639 feet per minute. Wet end 12 provides an analog reference voltage for controlling the speed of downstream machines in corrugator 10. This reference voltage is converted to a digital value at isolator station 22 and provided to controller 24. Speed display 64 is constantly updated by controller 24 to display the speed of corrugator 10 based upon the digital value of the analog reference voltage.

All of the information displayed in the operator messages shown in FIG. 3 and FIG. 4 is capable of being transmitted by controller 24 to reporting system 28. In this preferred embodiment, reporting system 28 is a data base in a computer which is in the same plant as controller 24 but which is remote. Reporting system 28 can be any controller at any location so long as it is at least periodically linked with controller 24.

There are essentially three things which cause corrugator 10 to stop or which keep it from being restarted. The first, and most frequent, is a standard operator control stop. This is where an operator merely pushes a stop button to stop corrugator 10. The second is a nonoperator control stop. This is a limit switch of any type operating properly to stop corrugator 10. The third is a component failure stop. This results from a faulty component such as a motor overload or a faulty circuit breaker. As previously discussed, the diagnostic system is capable of detecting all of these. Also, these can all be included in various report formats generated by reporting system 28.

FIG. 5a shows a summary report format which is generated by reporting system 28. The report shows the total downtime in hours, total number of stops, total number of standard operator control stops, total number of non-operator control stops and the total number of other component failure stops.

FIG. 5b is a more detailed report format generated by reporting system 28. This report contains the fault code for each fault condition detected by controller 24, the operator enteredreason for the fault condition, a brief description of the cause of the fault condition, the time that corrugator 10 stopped and the duration of the downtime.

FIG. 5c is a frequency format report generated by reporting system 28. This report shows the operator entered reason that corrugator 10 stopped, the corresponding description and the number of occurrences.

FIG. 5d shows a severity report format generated by reporting system 28. This report contains the same information as the report in FIG. 5c except that instead of the number of occurrence of the fault conditions, the total time in hours is shown.

FIG. 5e shows another form of frequency report format. This report shows the fault code associated with each fault condition detected by controller 24, the corresponding description and the number of occurrences.

FIG. 5f is a severity format report. This contains the same information as the report in FIG. 5e except, instead of the number of occurrences of each fault condition, the total hours of downtime caused by each fault condition is shown.

In addition, other combinations of information can be combined by reporting system 28 into report formats which are useful to management personnel. These reports can be used to allocate maintenance and to pinpoint machine problem areas. Also, they can be used to determine operator problems such as where additional training is required.

CONCLUSION

Diagnostic system S of the present invention analyzed the current condition of critical points in each machine in corrugator 10. It is capable of diagnostic substantially all points which could cause corrugator 10 to be stopped. Controller 24 periodically polls the critical points which are analyzed and the state of fault latches 23 and determines when potential stoppages are arising. Controller 24 then warns the operator through using an operator message at display/printer 26. If a fault condition does arise, controller 24 provides an operator message at display/printer 26 telling the operator what caused the fault condition, any subsequent faults which occurred and the current condition of corrugator 10 (i.e., what needs to be done to the machines in corrugator 10 in order to successfully restart corrugator 10). Controller 24 accomplishes this by supplying brief descriptions of the components causing the fault conditions and current conditions and help screens which include schematics, pictures, tutorials on how to remedy the fault conditions and current conditions and any other relevant documentation such as part numbers or print numbers which are associated with the fault condition or current condition.

Since controller 24 is periodically polling the logic signals received by isolator station 22 at a fast rate, and since any change in state of logic signals is latched at fault latches 23, controller 24 will "see" even intermittent problems which cause corrugator 10 to go down. These intermittent problems will be indicated to the operator in an operator message displayed at display/printer 26. Additionally, when corrugator 10 is stopped, controller 24 analyzes current condition of the critical points. Controller 24 keeps the operator apprised of what must be done, and in what order, to restart corrugator 10.

All the information provided by diagnosting system S of the present invention helps operators and repair or service personnel to quickly locate the reason why corrugator 10 has been stopped, to fix it and to successfully restart corrugator 10. This provides large savings in downtime and waste which results in higher business retention and less overtime and service pay.

All of the information acquired by diagnostic system S of the present invention has the capability of being uploaded into another system to be stored in a database. This information is analyzed and used, in this preferred embodiment, by reporting system 28 to produce production reports which are helpful in allocating resources and pinpointing problems. Additionally, diagnostic system S of the present invention has the capability of being networked with other diagnostic systems or other controllers.

Although the present invention has been described with reference to preferred embodiments, workers skilled in the art will recognize that changes may be made in form and detail without departing from the spirit and scope of the invention.

What is claimed is:

1. A diagnostic system for analyzing conditions of critical points in a corrugator and for generating an operator message based on the conditions, the diagnostic system comprising:
   sensing means for sensing the conditions of the critical points in the corrugator and for generating critical point signals representative of the conditions of the critical points;
   isolator means having an input port and an output port for receiving the critical point signals generated by the sensing means at the input port, and for generating logic signals representative of the critical point signals at the output port, the output port being isolated from the input port by the isolator means; and
   controller means for receiving the logic signals generated by the isolator means and for generating an operator message based on the logic signals wherein the controller means includes:
   first fault detection means for prioritizing faults to detect a first fault representing the condition of the particular critical point which caused the corrugator to stop running; and
   current condition detection means for periodically detecting a current condition representing whether the corrugator is in a ready to run state or in a most critical fault condition state wherein a most critical fault condition is identified which must be remedied to start the corrugator.

2. The diagnostic system of claim 1 and further comprising:
   display means, coupled to the controller means, for displaying the current condition of the corrugator, the display means being updated each time the current condition detection means detects a change in the most critical fault condition.

3. The diagnostic system of claim 1 wherein the isolator means further comprises:
   optical isolators for isolating the critical point signals and logic signals.

4. The diagnostic system of claim 1 wherein the controller means includes means for interfacing with a network including other controller means.

5. The diagnostic system of claim 1 wherein the controller means is configurable to ignore the logic signals corresponding to the critical point conditions from a plurality of machines in the corrugator.

6. The diagnostic system of claim 1 wherein the controller means further comprises:
fault storing means for storing fault information corresponding to the first fault.

7. The diagnostic system of claim 6 and further comprising:
display means coupled to the controller means, for displaying the operator message.

8. The diagnostic system of claim 7 wherein the operator message comprises the fault information stored in the fault storing means.

9. The diagnostic system of claim 1 wherein the controller means further comprises:
help generating means for generating a plurality of selectable help messages, selectable by an operator, the selectable help messages containing trouble-shooting information relating to the first fault and the most critical fault condition of the corrugator.

10. The diagnostic system of claim 9 and further comprising:
display means, coupled to the controller means, for displaying the selectable help messages.

11. The diagnostic system of claim 10 wherein the trouble-shooting information comprises:
schematic diagrams, pictorial representations, tutorial text and part and document identification information.

12. The diagnostic system of claim 1 and further comprising:
reason entering means, coupled to the controller means, for entering an operator reason why a fault condition arose.

13. The diagnostic system of claim 12 wherein the controller means further comprises:
reason storage means, coupled to the reason entering means, for storing a plurality of operator reasons entered at the reason entering means.

14. The diagnostic system of claim 13 and further comprising:
reason display means, coupled to the controller means, for displaying the plurality of operator reasons.

15. The diagnostic system of claim 1 wherein the controller means further comprises:
downtime detector means for detecting cumulative downtime data over a predetermined time interval.

16. The diagnostic system of claim 15 and further comprising:
downtime storage means, coupled to the controller means for storing the cumulative downtime data.

17. The diagnostic system of claim 16 and further comprising:
downtime display means, coupled to the controller means, for displaying the cumulative downtime data.

18. The diagnostic system of claim 1 wherein the controller further comprises:
downtime duration detector means for detecting duration of a present fault condition.

19. The diagnostic system of claim 18 and further comprising:
downtime duration storage means, coupled to the controller means, for storing the downtime duration.

20. The diagnostic system of claim 19 and further comprising:
downtime duration display means, coupled to the controller means, for displaying the downtime duration.

21. The diagnostic system of claim 1 wherein the controller means further comprises:
clock means for keeping and displaying a current time and date.

22. The diagnostic system of claim 4 and further comprising:
time storage means, coupled to the controller means, for storing a time and date of fault conditions,
the display means further displaying the time and date of fault conditions.

23. The diagnostic system of claim 1 and further comprising:
display means, coupled to the controller means, for displaying a running message when no fault conditions exist.

24. The diagnostic system of claim 23 and further comprising:
speed detection means, coupled to the controller means, for detecting the speed at which the corrugator is running based on a corrugator speed reference signal.

25. The diagnostic system of claim 24, the display means further displaying the speed at which the corrugator is running.

26. The diagnostic system of claim 1 wherein the controller means further comprises:
subsequent fault detection means for detecting a subsequent fault based on the logic signals, the subsequent fault representing condition of a critical point which prevents the corrugator from being restarted after the first fault has caused the corrugator to stop running and after the corrugator has been returned to a ready to run state, where the subsequent fault arises after the first fault.

27. The diagnostic system of claim 26 wherein the isolator means further comprises:
fault latch means for latching state changes in the critical point signals, the state changes representing the first fault and subsequent fault and for providing logic signals representing the state changes to the controller means; and
current state output means for providing logic signals to the corrugator condition detection means representing current states of the critical point signals.

28. The diagnostic system of claim 1 wherein the controller polls the fault latch means to determine the first fault and the subsequent fault and where the controller polls the current state output means to determine the corrugator condition and the most critical fault condition.

29. The diagnostic system of claim 26 wherein the controller further comprises:
subsequent fault storing means for storing subsequent fault information corresponding to the subsequent fault.

30. The diagnostic system of claim 29 and further comprising:
display means, coupled to the controller means, for displaying the subsequent fault information.

31. The diagnostic system of claim 30 wherein the controller means further comprises:
help generating means for generating a plurality of selectable help messages, selectable by the operator, the selectable help messages containing trouble-shooting information relating to the subsequent fault.

32. The diagnostic system of claim 31 wherein the display means further displays the selectable help messages.

33. The diagnostic system of claim 32 wherein the trouble-shooting information comprises:
schematic diagrams, pictorial representations, tutorial text and part in document identification information.

34. The diagnostic system of claim 1 wherein the controller further comprises:
warning detection means for detecting a warning condition based on the logic signals when the condition of a critical point could result in the corrugator stopping at a future time if the condition is not changed.

35. The diagnostic system of claim 34 wherein the controller further comprises:
help generating means for generating a plurality of selectable help messages, the display means further displaying the selectable help messages containing trouble-shooting information relating to the warning condition, the displayed selectable help messages being selectable by the operator.

36. The diagnostic system of claim 35 and further comprising:
warning display means, coupled to the controller means, for displaying the warning condition.

37. The diagnostic system of claim 36 wherein the trouble-shooting information comprises:
schematic diagrams, pictorial representations, tutorial text and part and document identification information.

38. The diagnostic system of claim 37 wherein the warning detection means further comprises:
alarm generating means for generating an alarm when a warning condition is detected.

39. The diagnostic system of claim 1 wherein the controller means further comprises:
last fault determining means for determining a last fault condition which existed most recently prior to an existing fault condition.

40. The diagnostic system of claim 39 and further comprising:
last fault storage means, coupled to the controller means, for storing a plurality of last fault conditions.

41. The diagnostic system of claim 40 and further comprising:
display means, coupled to the controller means, for displaying the plurality of last fault conditions.

42. The diagnostic system of claim 41 wherein the controller further comprises:
last reason determining means for determining a last operator reason for the last fault condition.

43. The diagnostic system of claim 42 and further comprising:
last reason storage means, coupled to the controller means, for storing a plurality of last operator reasons.

44. The diagnostic system of claim 43, the display means, further displaying the plurality of last operator reasons.

45. The diagnostic system of claim 44 wherein the controller means further comprises:
editing means, coupled to the display means, for editing the plurality of last operator reasons displayed.

46. The diagnostic system for analyzing conditions of critical points in a production line and for generating an operator message based on the conditions, the diagnostic system comprising;
sensing means for sensing the conditions of the critical points in the production line and for generating critical point signals representative of the conditions of the critical points; and
controller means for receiving the critical point signals generated by the sensing signals and for generating an operator message based on the critical point signals wherein the controller means includes:
first fault detection means for prioritizing faults to detect a first fault representing the condition of the particular critical point which caused the production line to stop running; and
subsequent fault detection means for detecting a subsequent fault representing the condition of a critical point which has prevented the production line from being restarted after the first fault caused the production line to stop running, and after the production line has been returned to a ready to run state, where the subsequent fault arises after the first fault.

47. The diagnostic system of claim 46 wherein the controller means further comprises:
current condition detection means for detecting, based on the critical points signals, a most critical current condition keeping the production line from being restarted.

48. The diagnostic system of claim 47 wherein the controller means further comprises:
warning detection means for detecting based on the critical point signals, a warning condition capable of resulting in production line stoppage at a future date if the warning condition is not remedied.

49. The diagnostic system of claim 48 wherein the controller means further comprises:
message generating means for generating an operator message indicating the first fault condition, the subsequent fault condition, the warning condition, and the current condition of the critical points.

50. The diagnostic system of claim 49 and further comprising:
display means, coupled to the controller means, for displaying the operator message.

51. The diagnostic system of claim 50 wherein the production line comprises a plurality of machines.

52. The diagnostic system of claim 51 wherein the plurality of machines comprise a corrugator.

53. A method for analyzing critical points in a production line comprising the steps of:
prioritizing faults to identify an initial fault condition, based on state of the critical points, which caused the production line to stop running;
detecting a current condition of the production line representing the state of a most critical point where the current condition is keeping the production line from being restarted; and generating an operator message based on the initial fault condition and the current condition.

54. The method of claim 53 and further comprising: bypassing selected machines in the production line.

55. The method of claim 53 wherein the step of detecting the current condition is performed periodically until the production line is running.

56. The method of claim 55 wherein the operator message is updated each time the step of detecting the current condition is performed.

57. The method of claim 56 and further comprising the step of:
 detecting a subsequent fault condition, based on the critical points, where the subsequent fault condition caused the production line to go from the ready-to-run state to a down state.

58. The method of claim 57 and further comprising the step of:
 detecting a warning condition based on the critical points when the production line is running, the warning condition potentially resulting in the production line going to the down state.

59. The method of claim 58 and further comprising the step of:
 accepting an operator reason for the initial fault condition.

60. The method of claim 58 wherein the step of generating the operator message further comprises the steps of:
 generating initial fault information indicating the critical point which caused the initial fault;
 generating current condition information indicating the critical point causing the current condition;
 generating subsequent fault information indicating the critical point causing the subsequent fault condition; and
 generating warning information corresponding to the warning condition.

61. The method of claim 60 wherein the operator message comprises information indicating how to remedy the initial fault, current condition, subsequent fault and warning condition.

62. A method for analyzing critical points in a production line where critical points change state when a fault condition occurs stopping the production line, the method comprising the steps of:
 storing state changes of the critical points in fault latches;
 determining that the production line has stopped based on a production line condition signal;
 sampling the fault latches and prioritizing fault conditions to determine an initial fault condition causing the production line to stop;
 sampling current states of the critical points after sampling the fault latches;
 determining a most critical current condition of a critical point in keeping the production line from starting; and
 generating an operator message indicating the critical point causing the initial fault and indicating the most critical current condition.

63. An apparatus for analyzing critical points in a production line comprising:
 identifying means for prioritizing fault conditions to identify an initial fault condition, based on a state of the critical points, the initial fault condition causing the production line to stop running;
 detecting means for detecting a current condition of the production line representing the states of a most critical point keeping the production line from being restarted; and
 generating means for generating an operator message based on the initial fault and the current condition.

64. The apparatus of claim 63 wherein the production line includes a plurality of machines and wherein the identifying means only identifies the initial fault condition in selected machines in the production line, and further comprising:
 bypass means for ignoring deselected machines in the production line.

65. The apparatus of claim 63 wherein the detecting means detects the current condition periodically until the production line is running.

66. The apparatus of claim wherein the operator message is updated each time the detecting means detects the current condition.

67. The apparatus of claim 66 and further comprising:
 subsequent fault detecting means for detecting a subsequent fault condition based on the critical points causing the production line to go from the ready to run state to a down state.

68. The apparatus of claim 67 and further comprising:
 warning detecting means for detecting a warning condition based on the critical points when the production line is running, the warning condition potentially resulting in the production line going to the down state.

69. The apparatus of claim 68 and further comprising:
 accepting means for accepting an operator reason for the initial fault condition.

70. The apparatus of claim 68 wherein the generating means further comprises:
 initial fault generating means for generating initial fault information indicating the critical point causing the initial fault;
 current condition generating means for generating current condition information indicating the critical point causing the current condition;
 subsequent fault generating means for generating subsequent fault information indicating the critical point causing the subsequent fault condition; and
 warning generating means for generating warning information corresponding to the warning condition.

71. The apparatus of claim 70 wherein the operator message further comprises:
 remedy information indicating how to remedy the initial fault, current condition, subsequent fault, and the warning condition.

72. An apparatus for analyzing critical points in a production line where the critical points change state when a fault condition occurs stopping the production line, the apparatus comprising:
 storing means for storing state changes of the critical points, the state changes being stored in fault latches;
 determining means for determining that the production line has stopped based on a production line condition signal;
 sampling means for sampling the fault latches and prioritizing fault conditions to determine an initial fault condition which caused the production line to stop;
 current sampling means for sampling current states of the critical points after sampling the fault latches;

critical determining means for determining a most critical current condition of a critical point in keeping the production line from starting; and generating means for generating an operator message indicating the critical point causing an initial fault and indicating the most critical current condition.

73. The apparatus of claim 72 wherein the production line includes a plurality of machines and wherein the critical determining means determines the most critical current condition of a critical point in selected machines, and further comprising:

bypass means for ignoring deselected machines in the production lines.

* * * * *

UNITED STATES PATENT AND TRADEMARK OFFICE
CERTIFICATE OF CORRECTION

PATENT NO. : 5,027,293
DATED : June 25, 1991
INVENTOR(S) : David G. Pung et al.

It is certified that error appears in the above-identified patent and that said Letters Patent is hereby corrected as shown below:

Col. 22, line 13, delete "claim 4", insert --claim 21--.

Col. 22, line 53, delete "claim 1", insert --claim 27--.

Col. 24, line 17, delete "signals", insert --means--.

Col. 26, line 17, delete "claim", insert --claim 65--.

Signed and Sealed this

Thirteenth Day of October, 1992

Attest:

DOUGLAS B. COMER

Attesting Officer         Acting Commissioner of Patents and Trademarks